Patented Sept. 5, 1922.

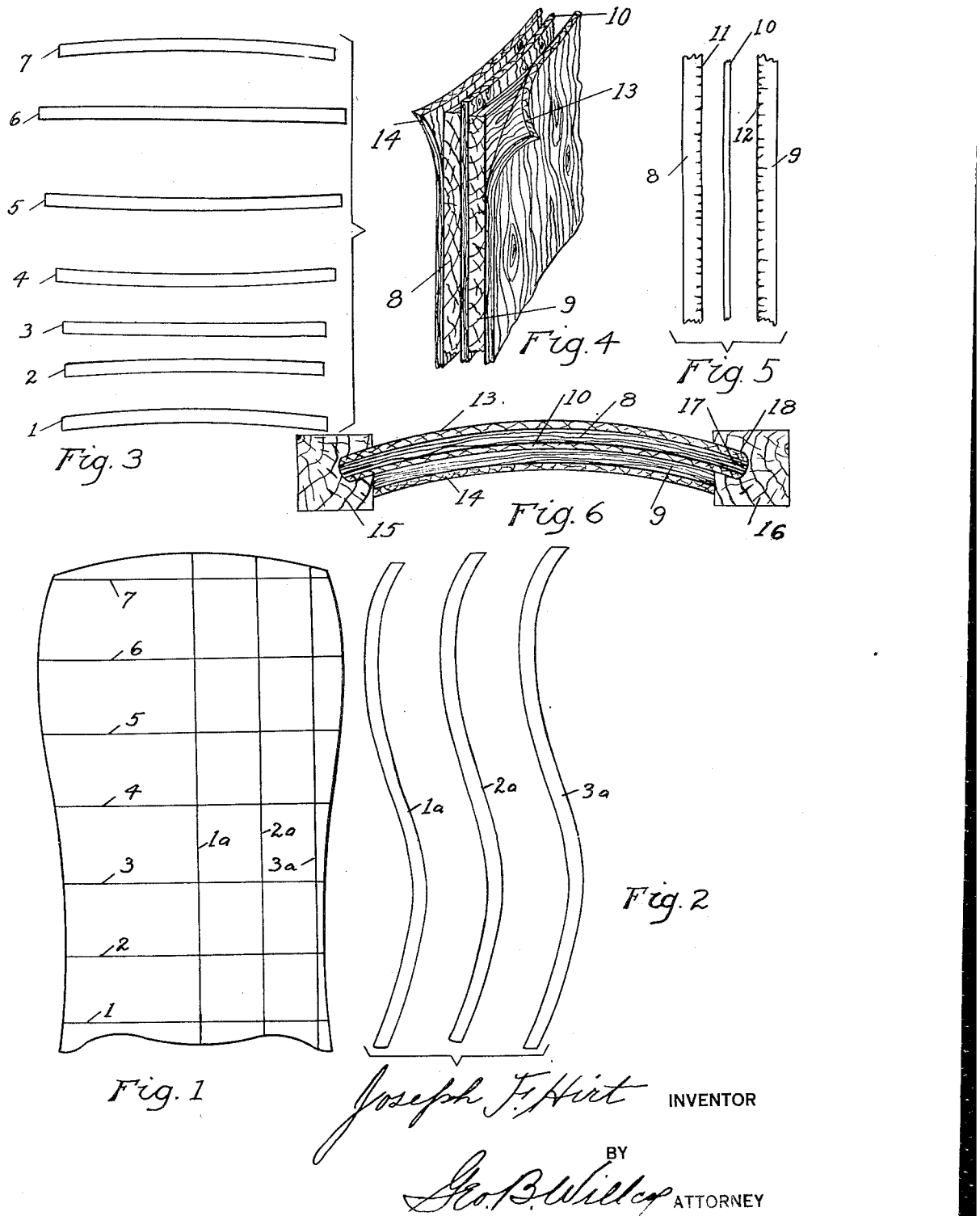

1,427,812

UNITED STATES PATENT OFFICE.

JOSEPH F. HIRT, OF CHICAGO, ILLINOIS, ASSIGNOR TO SONORA PHONOGRAPH COMPANY, A CORPORATION OF NEW YORK.

PANEL.

Application filed April 6, 1920. Serial No. 371,663.

*To all whom it may concern:*

Be it known that I, JOSEPH F. HIRT, a citizen of the United States, residing at Chicago, in the county of Cook and State of Illinois, have invented certain new and useful Improvements in Panels; and I do hereby declare the following to be a full, clear, and exact description of the invention, such as will enable others skilled in the art to which it appertains to make and use the same.

This invention relates to improvements in bulge panels used in the manufacture of furniture such as phonograph cabinets and the like.

Panels of the so-called bulge type have surfaces that are warped or bowed, not only in the transverse direction, but also longitudinally, so that the surface of the finished panel presents a contour that is bulged or bowed outwardly in some parts of its area and dished or bowed inwardly in other parts of its area.

It has heretofore been customary to manufacture bulge panels of this type by building up cores or bodies by first gluing wooden strips together side by side to form a relatively thick panel blank and then forming the face of this panel to the desired bulge shape by cutting, either with automatic carving machines, or by turning, as on the face-plate of a lathe, and finally gluing to each side of the bulge-shaped core so formed a thin sheet of veneer, the grain of which runs transversely. Upon each of these outer sheets of veneer, or crossbands as they are called, the final or outer layers of veneer are glued, the grain of these outer layers extending lengthwise the panel.

In the former method a panel is formed having a rigid central core carved to shape and consequently formed without bending and without any inherent internal strains.

In manufacturing carved or machined cores of the foregoing type, the wood is sometimes splintered and the defects so produced have to be remedied by hand-work, as by inserting a wooden plug, or filler, or by filling the cavity of the core surface with various filling preparations.

It is the object of my present invention to provide a method of manufacturing panels of the bulge type, whereby to produce a smoother and more uniform finished surface and to materially reduce the cost of manufacture, by reason of the less number of operations and less amount of material required in the construction of the panel.

A further object is to provide a panel of great strength and of such construction that its lateral edges can be strongly mortised into the frame or corner posts of the cabinet or other article of furniture.

With the foregoing and certain other objects in view, which will appear later in the specification, my invention consists in a panel constructed as herein described and claimed, or the equivalents thereof.

In the accompanying drawings, Fig. 1 is a front view of a panel formed according to my improved method, the straight lines on the surface of the panel indicating lines along which the panel has been cut, for the purpose of showing the contour of the surface in the plane indicated by those lines.

Fig. 2 is a diagrammatic view, showing the contour of the panel surface at different distances from the center line of the panel outward toward the side edge.

Fig. 3 are successive contours, taken in planes across the panel.

Fig. 4 is a perspective detail, showing the relative arrangement of the layers of thick and thin veneer, the edges of the outer surface sheets represented as turned back, to better expose the inner layers comprising the core.

Fig. 5 is a diagrammatic view showing the relative assembly arrangement of the central thin veneer and the two thick outer layers with their porous faces inward.

Fig. 6 is a horizontal section through a panel and two legs of a cabinet, the view being distorted, to better illustrate the construction.

Numerals 1 to 7 in Figs. 1 and 3 show the successive transverse contours at different heights along the panel. Numerals 1ª and 3ª inclusive show successive contours at different distances out from the center of the panel.

The curvatures of the panel contours have been exaggerated in the drawing, for purpose of better illustration.

It will be understood that the bulge face illustrated is only one of an almost infinite number of forms into which the panel may be shaped to attain different outside bulge surface effects.

Referring to the successive transverse sections on the lines 1 to 7 inclusive, as shown in Fig. 3, contour 1 is convex; 2 is less convex; 3 is slightly concave; 4 is still more concave; 5 is slightly concave; 6 is practically straight and 7 is convex.

Referring to Fig. 2 showing the contours of successive longitudinal sections, the warping of the surfaces in the longitudinal direction at different distances from the center line is illustrated.

In constructing my improved panel, I first take two sheets of relatively thick veneer, as 8 and 9, say, about one-eighth or three-sixteenth inch thick and slightly larger than the length and width of the panel to be made, and arrange them with their grain extending crosswise the panel, as indicated in Figs. 4 and 6. I place these two sheets of veneer face-to-face with a thin sheet of veneer 10 between, this intermediate thin sheet being preferably made of a fine grain tough wood, the direction of its grain extending lengthwise the panel, that is, at right angles to the direction of the grain of the two layers of thick veneer 8 and 9.

I furthermore preferably arrange the two thick layers with their porous faces 11 and 12 next to the intermediate thin layer 10, as diagrammatically indicated in Fig. 5.

It will be remembered that a sheet of veneer has one face which is more porous than the other, on account of the action of the cutting knife by which the veneer is shaved or turned from the log. These porous faces 11 and 12 absorb more glue than the opposite faces, and consequently draw tighter to the intermediate thin panel 10 than would be the case if the less porous faces of the thick layers were placed next the intermediate layer.

The core or body of the panel having been built up, as just described, by the two thick layers and the intermediate thin layer, I next apply a thin sheet of veneer as 13 to the outside surface and another thin sheet 14 to the inside surface of the core, the direction of grain of these outer and inner layers being lengthwise the panel. The assembled panel blank is then placed in a press and formed to shape, the glue being allowed to set while the panel is still under pressure.

The built-up final core comprising the two thick layers with their grain running crosswise the panel, and the intermediate thin layer with its grain running lengthwise the panel can be easily pressed into the bulge shape while the glue is soft.

In taking their bulge form, the successive sheets of veneer slide upon each other slightly and adjust themselves to the final curvature of the bulge, somewhat in the same manner that the leaves of a flexible book slide upon themselves when the book is bent.

When the glue is set and has become thoroughly dried there is less tendency for this built-up core to warp or return to its original flat state than there would be if the core had been made of a single piece of thick wood bent to shape, because the laminated structure is not subjected to the internal fibre stresses that are present in a thick core that has been forced into bulge shape under pressure.

It is important, however, to note the direction in which the grain of the two thick core-bands is laid, that is, with their grain extending crosswise the panel, for with this construction the core bands 8 and 9 act like girders supported at their ends by the legs or corner-posts 15, 16 of the cabinet.

The lateral edges of the panel may be secured to the post by any suitable means, although I prefer to form tenons as 17, on the edges of the panels, and to glue these tenons into the mortises, as 18, extending lengthwise the legs or posts 16. This construction presents the end wood of the thick cross-bands to the posts 16 and forms an exceedingly rigid construction. The bulge panel so formed tends to retain its correct shape, whereas a veneer panel built up as in ordinary furniture construction with a number of plys of relatively thin veneer does not retain its shape satisfactorily.

The finished surface of a panel made in accordance with this method is smooth and of proper curvature and there are no depressions or defects in the core which can show through the outer veener 13 and appear in the final polished surface.

This method of panel construction avoids many of the mechanical operations of production that are obliged to be performed in the manufacture of panels by the method of carving or turning a solid wooden core to the form of a bulge, and considerably reduces the cost of quantity manufacture of bulge panels for cabinets and other articles of furniture.

Having thus described my invention, what I claim and desire to secure by Letters Patent is:

1. A panel comprising a central sheet of veneer having its grain disposed lengthwise the panel, a cross-band of thick veneer on each side of said central sheet, the cross-bands having their respective porous faces next to the central sheet, the grain of said cross-bands being disposed crosswise to the panel, said sheet and cross-bands being glued together and pressed to bulge shape.

2. A panel comprising a central sheet of thin veneer having its grain disposed lengthwise the panel, a cross-band of thick veneer on each side of said central sheet, the cross-bands having their respective porous faces next to the central sheet, the grain of said cross-bands being disposed crosswise the panel, said sheet and cross-bands being glued together and pressed to bulge form.

3. A panel comprising a central sheet of veneer having its grain disposed lengthwise the panel, a cross-band of thick veneer on each side of said central sheet, the cross-bands having their respective porous faces next to the central sheet, the grain of said cross-bands being disposed cross-wise the panel, said sheet and cross-bands being glued together and pressed to bulge form, and a longitudinal tenon formed in the lateral edges of said cross-bands, the grain of said tenons disposed in a direction crosswise the panel.

4. A panel comprising a central sheet of veneer, a cross-band of veneer on each side of said sheet, the grain of said cross-bands being disposed crosswise the panel, the cross-bands having their respective porous faces next to the central sheet, said sheet and cross-bands being glued together and pressed to bulge shape, and a longitudinal tenon formed in the lateral edges of said cross-bands.

5. A panel comprising a central sheet of veneer, having its grain disposed lengthwise the panel, a cross-band of veneer on each side of said central sheet, the grain of said cross-bands being disposed crosswise the sheet, the said cross-bands having their respective porous faces next to the central sheet, said sheet and cross-bands being glued together and pressed to bulge shape.

6. A panel comprising a thin central sheet of veneer, having its grain disposed lengthwise the panel, two relatively thick sheets of veneer on each side of said central sheet with their respective porous faces next to the central sheet and a thin sheet applied to the outer surface and another thin sheet to the inner surface of said respective thick members, the direction of the grain of said outer and inner thin sheets being lengthwise the panel; the aforesaid assembled members being secured together to form a panel.

In testimony whereof, I affix my signature in presence of two witnesses.

JOSEPH F. HIRT.

Witnesses:
E. H. JENNINGS,
D. O. DECKER.